United States Patent
Oteri et al.

(10) Patent No.: US 8,185,798 B2
(45) Date of Patent: May 22, 2012

(54) TECHNIQUES FOR REDUCING JOINT DETECTION COMPLEXITY IN A CHANNEL-CODED MULTIPLE-INPUT MULTIPLE-OUTPUT COMMUNICATION SYSTEM

(75) Inventors: Oghenekome F. Oteri, Austin, TX (US); Leo G. Dehner, Austin, TX (US); Jayesh H. Kotecha, Austin, TX (US); Hoojin Lee, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 996 days.

(21) Appl. No.: 12/165,073

(22) Filed: Jun. 30, 2008

(65) Prior Publication Data

US 2009/0327835 A1 Dec. 31, 2009

(51) Int. Cl.
*H03M 13/00* (2006.01)

(52) U.S. Cl. ........ 714/758; 714/748; 714/749; 714/752; 455/205

(58) Field of Classification Search .................. 714/748, 714/749, 752, 758; 375/267; 455/205
See application file for complete search history.

(56) References Cited

U.S. PATENT DOCUMENTS

| | | | |
|---|---|---|---|
| 6,757,337 B2 | 6/2004 | Zhuang et al. | |
| 7,154,936 B2 | 12/2006 | Bjerke et al. | |
| 7,212,579 B2 * | 5/2007 | Claussen et al. | 375/267 |
| 7,236,536 B2 | 6/2007 | Hochwald et al. | |
| 7,248,651 B2 | 7/2007 | Love et al. | |
| 2003/0072285 A1 * | 4/2003 | Onggosanusi et al. | 370/335 |
| 2007/0201632 A1 * | 8/2007 | Ionescu | 379/88.01 |
| 2008/0153444 A1 * | 6/2008 | Chen et al. | 455/205 |
| 2009/0044065 A1 * | 2/2009 | She et al. | 714/748 |
| 2009/0106619 A1 * | 4/2009 | Onggosanusi et al. | 714/749 |
| 2009/0225889 A1 * | 9/2009 | Tsai et al. | 375/267 |
| 2011/0206009 A1 * | 8/2011 | Attar et al. | 370/331 |

OTHER PUBLICATIONS

W.H. Chin et al., List Stack Detection with Reduced Search Space for MIMO Communication Systems, Vehicular Technology Conference, May 2006, pp. 1713-1716, vol. 4, Issue , 7-10, IEEE.

* cited by examiner

*Primary Examiner* — Sam Rizk
(74) *Attorney, Agent, or Firm* — Yudell Isidore Ng Russell PLLC

(57) ABSTRACT

A technique for joint detection of channel-coded signals in a multiple-input multiple-output system includes detecting, when a decoded signal associated with a first symbol stream passes a cyclic redundancy check, channel-coded signals in the first symbol stream and a second symbol stream using minimum mean squared error with ordered successive interference cancellation (MMSE-OSIC) based detection. When the decoded signal associated with the first symbol stream fails the cyclic redundancy check, the channel-coded signals in the first and second symbol streams are detected using neighbor search algorithm (NSA) based detection.

20 Claims, 4 Drawing Sheets

TECHNIQUES FOR REDUCING JOINT DETECTION COMPLEXITY IN A CHANNEL-CODED MULTIPLE-INPUT MULTIPLE-OUTPUT COMMUNICATION SYSTEM

BACKGROUND

1. Field

This disclosure relates generally to reducing detection complexity in a communication system and, more specifically, to techniques for reducing joint detection complexity in a channel-coded multiple-input multiple-output communication system.

2. Related Art

Today, multiple-input multiple-output (MIMO) systems, which employ multiple antennas at a transmitter and multiple antennas at a single receiver or one or more antennas at multiple receivers (depending on the implementation), are becoming increasingly common. Single-user MIMO systems implement multiple antennas at a transmitter and multiple antennas at a receiver. In contrast, multi-user MIMO systems employ multiple antennas at a transmitter and consider multiple receivers (each of which may have one or more antennas) as spatial resources, with each of the multiple receivers corresponding to at least one output. In general, MIMO wireless communication systems exhibit increased data throughput (due to higher spectral efficiency) and increased link range (due to reduced fading) without requiring additional bandwidth or transmit power, respectively (as contrasted with multiple-input single-output (MISO), single-input multiple-output (SIMO), and single-input single-output (SISO) wireless communication systems). MIMO wireless communication systems generally employ precoding, spatial multiplexing (SM), diversity coding, a combination of SM and precoding, or a combination of SM and diversity coding.

In SM (which can be employed with or without channel state information (CSI) at a transmitter), an original signal is split into multiple lower-rate streams and each stream is transmitted from a different transmit antenna in the same frequency band. When the transmitted streams arrive at a receiver antenna array with sufficiently different spatial signatures, a MIMO receiver can separate the transmitted streams into parallel channels that exhibit increased signal-to-noise ratio (SNR), as compared to the original signal when transmitted as a single higher-rate stream.

Precoding employs beamforming to support multi-layer communications. Precoding normally utilizes knowledge of CSI at a transmitter in an attempt to maximize received signal levels at all antennas of a receiver. Precoding can be generally defined as a transformation applied to transmitted data before transmission, typically to align the transmission to a channel in some form to maximize a performance metric, e.g., SNR. Precoding, in general, can be a linear or non-linear transformation. In linear precoding, the transformation can be equivalently applied in the form of a matrix to the transmitted vector symbol on the multiple antennas. Typically, some form of channel knowledge is used at the transmitter to choose an appropriate precoder. In some cases, a receiver feeds back information about a channel or a precoder to a transmitter.

Various wireless networks, such as third-generation partnership project long-term evolution (3GPP-LTE) and IEEE 802.16 (also known as worldwide interoperability for microwave access (WiMAX)) compliant architectures, employ a scheduler (included within or coupled to a serving base station (BS)) that utilizes information derived from channel characterization to determine channel allocation for served user equipment (subscriber stations (SSs)). In a 3GPP-LTE compliant system, channel allocation, e.g., uplink and downlink assignments, is provided to SSs over a downlink shared control channel (physical downlink control channel (PDCCH)), which typically includes one or more control channel symbols.

To increase capacity and performance of wireless communication systems, receivers of a communication system may employ joint (multiple user) detection. Joint detection is similar to solving a least squares (LS) problem, which may represent a significant computational effort due to the amount of data that may be involved. In general, joint detection at a serving BS combines knowledge about all subscriber stations (SSs) that are active in one burst in a relatively large system of equations. This knowledge has included channel impulse responses (that have been estimated from training sequences), spreading codes, and received antenna samples. Typically, designers have attempted to develop algorithms that lower computational complexity associated with joint detection (at a serving BS and at SSs) without significantly degrading joint detection performance. Traditionally, joint detection has been performed using time-domain approaches (in contrast to frequency-domain approaches), due to the lower complexity traditionally associated with time-domain approaches.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
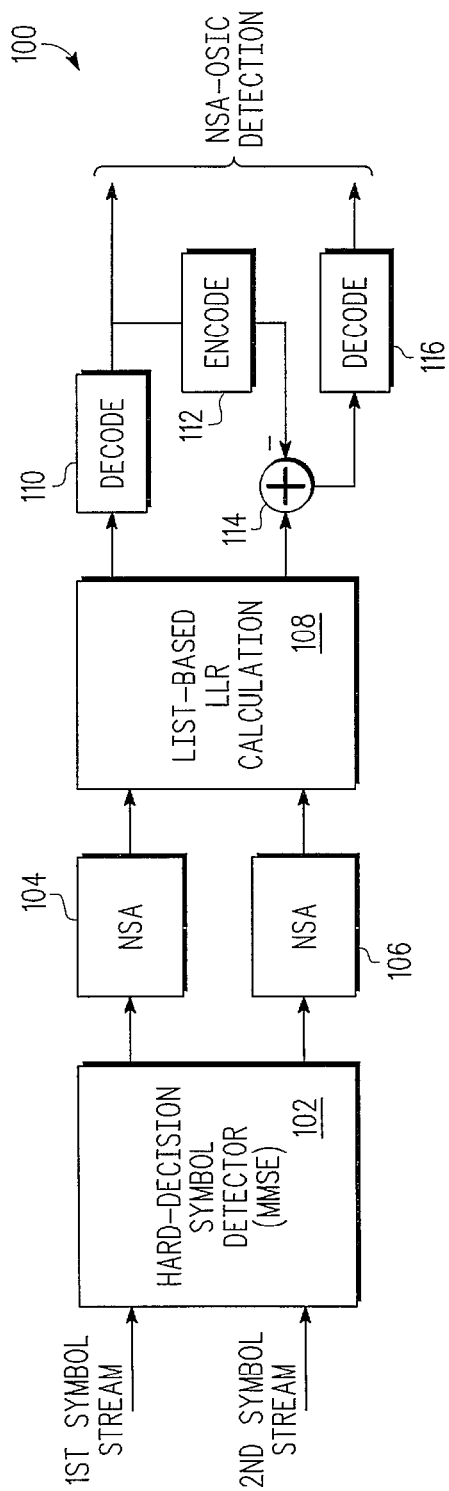
FIG. 1 is an example functional block diagram of a relevant portion of a receiver, configured according to one embodiment of the present invention, that is associated with a multiple-input multiple-output (MIMO) communication system.

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although various embodiments are described below in conjunction with a subscriber station, such as a cellular handset, it will be appreciated that the present invention is not so limited and may be embodied in various devices.

The term "channel," as may be used herein, includes one or more subcarriers, which may or may not be adjacent. Transmitters implemented within a communication system, configured according to various embodiments of the present disclosure, may transmit information using a phase shift keying (PSK), a quadrature amplitude modulation (QAM), or other data modulation scheme, depending upon which modulation scheme is scheduled. For example, any of the various PSK (such as pi/2 BPSK, QPSK, and 8-PSK), or QAM (such as 16-QAM and 64-QAM) modulation techniques may be implemented. While the discussion herein is directed to communication between a transmitter in a BS and a receiver in an SS, the techniques disclosed herein are broadly applicable to communication between a receiver and a transmitter irrespective of the location of the transmitter and the receiver.

In communication systems that employ multiple antennas, e.g., multiple-input multiple-output (MIMO) communication systems, it is generally desirable to employ efficient joint detection techniques to detect received signals. In particular, if received signals are channel-coded signals, a relatively complex receiver has traditionally been required to jointly detect and decode the received signals. In general, known receivers range from relatively low complexity receivers that provide relatively low performance (e.g., minimum mean squared error (MMSE) receivers) to relatively high complexity receivers that provide relatively high performance (e.g., maximum likelihood (ML) receivers). According to various aspects of the present disclosure, a receiver is configured to include a detector that has relatively low complexity while still providing adequate performance.

In general, MMSE with ordered successive interference cancellation (MMSE-OSIC) detectors, while having relatively low complexity, provide relatively low performance (as compared with an ML detector). According to various aspects of the present disclosure, a detector is configured to balance complexity with error performance. According to one aspect of the present disclosure, an efficient detection technique that utilizes a cyclic redundancy check (CRC) to switch between MMSE-OSIC detection and neighbor search algorithm (NSA) detection is employed in a receiver. That is, when a CRC error is indicated at the receiver, detection switches from MMSE-OSIC detection to NSA detection (which provides higher performance, albeit at the sake of increased complexity, as contrasted with MMSE-OSIC detection). In this manner, performance of MMSE-OSIC detection is provided when a CRC error is not indicated in a received stream. When a CRC error is indicated in a received stream, error performance may be improved by switching to NSA detection. Using this approach facilitates a lower complexity communication system than known communication systems that have comparable performance, particularly for a MIMO system with a relatively high-ordered constellation (e.g., 16-QAM or higher) and a relatively high code rate (e.g., a 5/6 code rate or higher).

For example, a linear log likelihood ratio (LLR) calculation may be employed by a detector to provide metrics for decoding symbols in a stream. In one embodiment, streams are decoded in succession with stream cancellation when a cyclic redundancy check (CRC) passes. As an alternative to employing CRC, statistics provided by an LLR calculation may be employed to determine when to switch from MMSE-OSIC detection to NSA detection. For example, a list-based LLR calculation may be employed with NSA detection. In general, list-based LLR calculations may be simplified by reducing a list size. While a larger list size typically provides better performance, a larger list size increases LLR calculation complexity. Moreover, while QR decomposition-M algorithm (QRD-M), QRD-stack, or sphere decoding may be employed, sorting procedures for constructing a list for QRD-M and QRD-stack are usually relatively complex. Furthermore, sphere decoding is also relatively complex. When a list-based NSA technique, according to the present disclosure, is employed to generate a candidate list, a sorting algorithm is not required and elaborate step-by-step neighbor construction is not required (as contrasted with sphere decoding). For example, a pre-constructed table may be used to choose neighbor constellation points (symbols).

In general, an error performance of MMSE-OSIC/NSA switch-based detection is between an error performance of MMSE-OSIC and ML-OSIC detection approaches. The complexity of MMSE-OSIC/NSA switch-based detection is also between the complexity of the MMSE-OSIC and ML detection approaches. The complexity of the MMSE-OSIC/NSA switch-based detection increases as a list size is increased, but is substantially below the complexity of ML detection approaches. In a typical case, a list size associated with MMSE-OSIC/NSA switch-based detection may be adjusted to meet a desired error performance. An MMSE-OSIC/NSA switch-based detector is considerably less complex than ML-OSIC and QRD-stack-OSIC detectors (albeit at reduced performance). Even with high-order constellations and large list sizes, a near ML detector constructed according to the present disclosure is substantially less complex than an ML detector. Moreover, for comparable error performance, an MMSE-OSIC/NSA switch-based detector generally exhibits lower complexity than known list-based detectors. In sum, MMSE-OSIC/NSA switch-based detection facilitates near ML performance with fixed complexity (due to a fixed list size generated by a neighbor search) and reduced complexity (due to the use of a truncated list of constellation points).

In general, known near ML decoders have variable complexity and usually employ a sorting algorithm, which increases complexity. For example, one prior art detection approach uses lists (that are constructed based on hard-decision symbols obtained by a stack algorithm) for a log likelihood ratio (LLR) calculation. Due to the complexity of the stack algorithm, the approach exhibits worse performance than a detection approach that employs a soft-input detector. In addition, if a list size is insufficient, the performance of the approach can be worse than MMSE-OSIC detection. Another prior art detection approach employs a list sphere detector that exhibits near maximum likelihood (ML) performance with lower complexity. However, the complexity of the approach is not fixed, which is not desirable in practice. Furthermore, such iteration-type detectors, while exhibiting improved performance, are relatively complicated. Yet another prior art detection approach employs a nulling and cancellation method to reduce the complexity of conventional ML decoding (albeit at the cost of performance degradation). Yet another prior art approach reduces LLR calculation complexity by using an algorithm that is similar to a neighbor search algorithm (NSA). However, the approach is still more complex than MMSE-OSIC detection.

In general, the techniques disclosed herein provide close to ML performance with a fixed complexity (due to the use of a fixed list size generated by the neighbor search) and reduced complexity (due to the use of a truncated list of constellation points). As noted above, in contrast many known list-based near ML detectors have variable complexity and employ a relatively complex sorting algorithm.

According to one embodiment of the present disclosure, a technique for joint detection of channel-coded signals in a multiple-input multiple-output (MIMO) system includes detecting, when a decoded signal associated with a first symbol stream passes a cyclic redundancy check (CRC), channel-coded signals in the first symbol stream and a second symbol stream using minimum mean squared error with ordered successive interference cancellation (MMSE-OSIC) based detection. When the decoded signal associated with the first symbol stream fails the CRC, the channel-coded signals in the first and second symbol streams are detected using neighbor search algorithm (NSA) based detection.

According to another embodiment of the present disclosure, a technique for joint detection of channel-coded signals in a multiple-input multiple-output system includes receiving, at a receiver, first and second symbol streams. Hard-decision symbol detection is performed on the first and second symbol streams to provide associated first and second estimated symbol streams. Channel-coded signals in the first and second symbol streams are then detected using neighbor search algorithm with ordered successive interference cancellation (NSA-OSIC) based detection on the first and second estimated symbol streams. In this case, interference in the second symbol stream that is attributable to the first symbol stream is substantially removed prior to decoding the second symbol stream.

According to another aspect of the present disclosure, a communication device (e.g., a base station (BS) or a subscriber station (SS)) includes an input device and a circuit coupled to the input device. The circuit is configured to detect, when a decoded signal associated with a first symbol stream passes a cyclic redundancy check, channel-coded signals in the first symbol stream and a second symbol stream using minimum mean squared error with ordered successive interference cancellation (MMSE-OSIC) based detection. The circuit is also configured to detect, when the decoded signal associated with the first symbol stream fails the cyclic redundancy check, the channel-coded signals in the first and second symbol streams using neighbor search algorithm (NSA) based detection.

With reference to FIG. 1, a relevant portion of a receiver 100, that is configured to implement a neighbor search algorithm with ordered successive interference cancellation (NSA-OSIC) detector, according to one embodiment of the present disclosure, is illustrated in block diagram form. It should be appreciated that the blocks may correspond to hardware or software (or a combination of software and hardware) that is executed on, for example, a processor (e.g., a digital signal processor (DSP)) having one or more execution units. The receiver 100 may be, for example, implemented in a base station (BS) or a subscriber station (SS). As is shown, inputs of a hard-decision symbol detector (e.g., an MMSE detector) 102 receive a first data (symbol) stream and a second data (symbol) stream. It should be noted that the first symbol stream corresponds to a best symbol stream, as contrasted with the second symbol stream, as selected by some metric (e.g., SNR, effective SNR, signal-to-interference and noise ratio (SINR), effective SINR, or energy). A first output of the detector 102 provides an estimated first symbol stream to an input of a neighbor search algorithm (NSA) block 104 and a second output of the detector 102 provides an estimated second symbol stream to an input of NSA block 106.

The blocks 104 and 106 are configured to provide a list of possible constellation points, based on inputs from the block 102. The block 104 and 106 may, for example, choose a number of neighbor constellation points (symbols) for an estimated constellation point based on a neighbor table. In this manner, the number of neighbors may be limited to reduce computation in later blocks. For example, in a system that employs 16-QAM, a list may include five constellation points (four neighbors of the estimated constellation point and the estimated constellation point). An output of the block 104 is provided to a first input of a list-based LLR calculation block 108, which provides a metric (for each the constellation points of the list) that indicates a likelihood that a given one of the constellation points is a correct constellation point. An output of the block 106 is provided to a second input of the block 108. A first output of the block 108 is provided to a decode block 110, whose output provides decoded symbols for the first symbol stream. The output of the block 110 is also provided to an input of an encode block 112, which encodes the decoded symbols at the output of the block 110.

Figure 2:
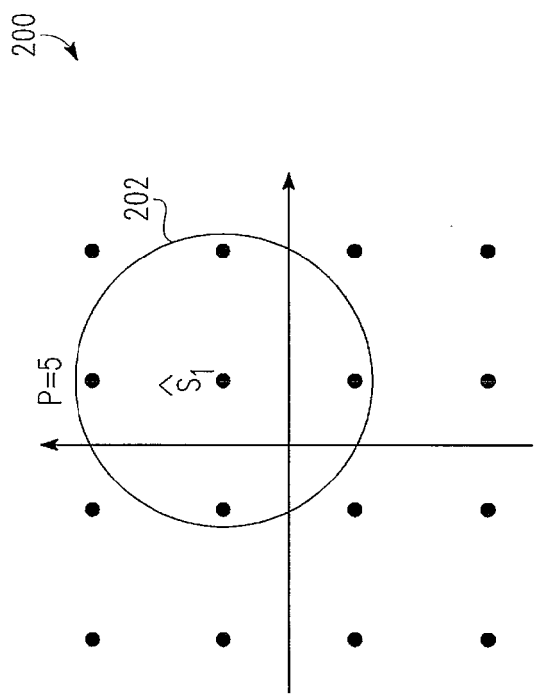
FIG. 2 is a quadrature amplitude modulation (QAM), specifically 16-QAM, constellation diagram indicating neighbors of a constellation point (symbol) that are provided by a neighbor search table, according to another embodiment of the present invention.

An output of the block 112 is coupled to a negative input of a summer 114. A positive input of the summer 114 is coupled to a second output of the block 108. An output of the summer 114 provides an interference cancelled signal (i.e., subtracts the first symbol stream from the second symbol stream to remove interference, caused by the first symbol stream, from the second symbol stream) to an input of decode block 116, whose output provides decoded symbols for the second symbol stream. Moving to FIG. 2, a constellation diagram for a 16-QAM system is illustrated. In this case, an NSA block has provided a list that includes five symbols (P=5) for an estimated constellation point ($\hat{S}_1$). As noted above, neighbor constellation points (of an estimated constellation point) may be selected from a neighbor table.

Figure 3:
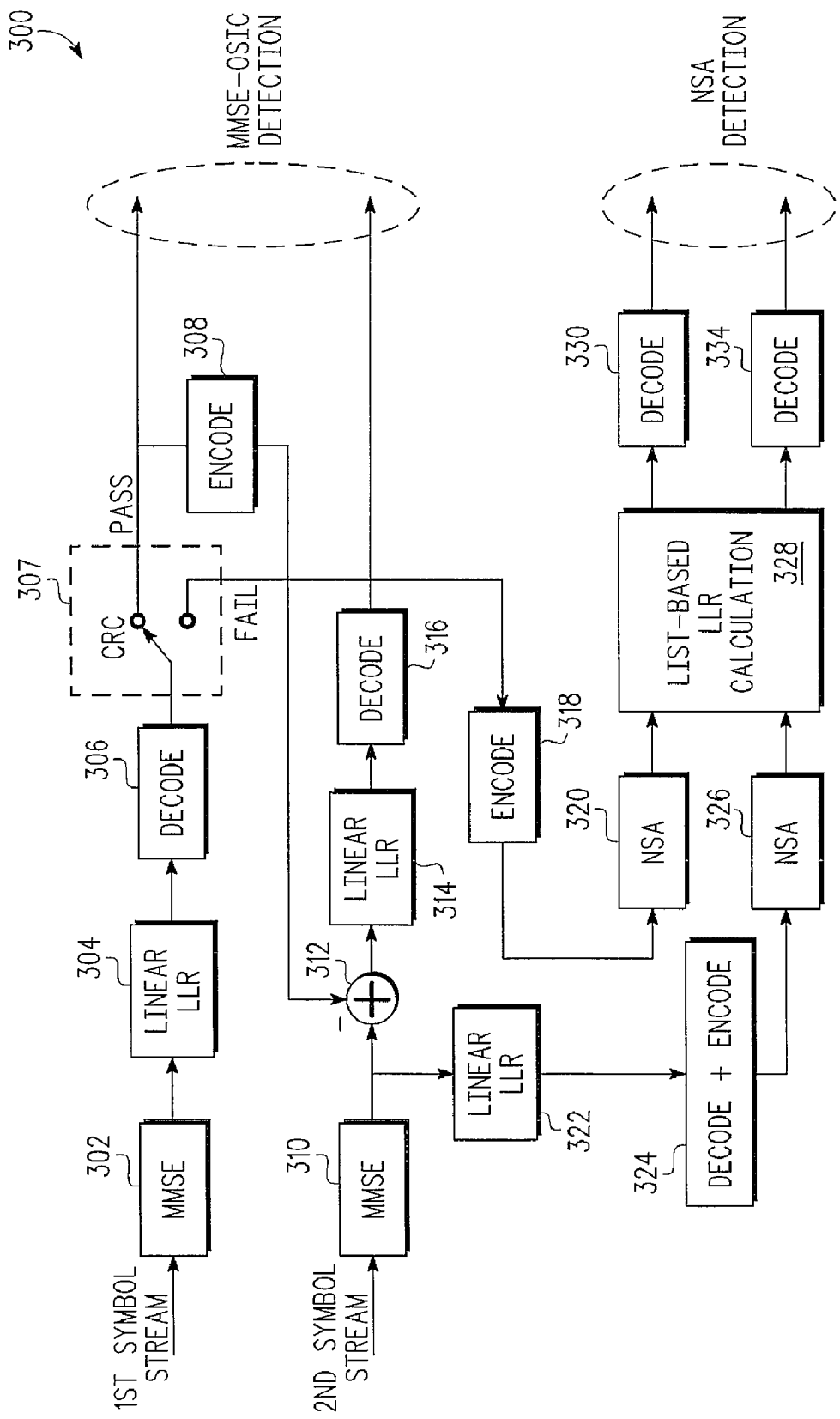
FIG. 3 is an example functional block diagram of a relevant portion of another receiver, configured according to another embodiment of the present invention, that is associated with a multiple-input multiple-output (MIMO) communication system

With reference to FIG. 3, a relevant portion of a receiver 300, that is configured to implement an MMSE-OSIC/NSA switch-based detector according to another embodiment of the present disclosure, is illustrated in block diagram form. The receiver 300 may be, for example, implemented in a base station (BS) or a subscriber station (SS). More specifically, when a first symbol stream passes a cyclic redundancy check (CRC), the receiver 300 is configured as an MMSE-OSIC detector, and when the first symbol stream fails the CRC, the receiver 300 is configured as an NSA detector. As above, it should be appreciated that the blocks of the receiver 300 may correspond to hardware or software (or a combination of software and hardware) that is executed on, for example, a processor (e.g., a DSP) having one or more execution units. As is shown, an input of an MMSE detector 302 receives a first data (symbol) stream and an input of an MMSE detector 310 receives a second data (symbol) stream. In this example, the first symbol stream corresponds to a best symbol stream, as contrasted with the second symbol stream, as selected by some metric (e.g., effective SNR or energy).

An output of the detector 302 provides an estimated first symbol stream to an input of a linear log likelihood ratio (LLR) calculation block 304. An output of the block 304 (which includes an estimated symbol associated with the first symbol stream and a metric that indicates a likelihood that the estimated symbol is correct) is provided to an input of a decode block 306, whose output provides decoded symbols associated with the first symbol stream to a CRC block 307. When the decoded symbols for the first symbol stream pass a CRC, the decoded symbols are provided at a pass output of the block 307 and to an input of an encode block 308, which encodes the decoded symbols at the output of the block 307. An output of the block 308 is provided to a negative input of a summer 312. An output of the detector 310 provides an estimated second symbol stream to a positive input of the summer 312. An output of the summer 312 provides an interference cancelled signal (i.e., subtracts the first symbol stream from the second symbol stream to remove interference, caused by the first symbol stream, from the second symbol stream) to an input of linear LLR calculation block 314. An output of the block 314 (which includes an estimated symbol associated with the second symbol stream and a metric that indicates a likelihood that the estimated symbol is correct) is provided to an input of a decode block 316, whose output provides decoded symbols for the second symbol stream when the decoded symbols for the first symbol stream pass the CRC.

When the first symbol stream does not pass the CRC in block 307, the output of the block 306 is directed to a fail output of the block 307 and to an input of encode block 318. An output of the encode block 318 is provided to an input of an NSA block 320. Similarly, an output of the block 310 is provided to an input of a linear LLR calculation block 322, whose output is provided to a decode and encode block 324. An output of the block 324 is provided to an input of an NSA block 326. The blocks 320 and 326 are configured to provide a list of possible constellation points, based on outputs from the blocks 302 and 310, respectively. The blocks 320 and 326 may, for example, choose a number of neighbor constellation points for an estimated constellation point based on a neighbor table. The number of neighbors may be limited to reduce computation in later blocks. For example, in a system that employs 64-QAM, a list may include nine constellation points (eight neighbors of the estimated constellation point and the estimated constellation point).

An output of the block 320 is provided to a first input of a list-based LLR calculation block 328, which provides a metric for each the constellation points of the list that indicates a likelihood that a given one of the constellation points is a correct constellation point. An output of the block 326 is provided to a second input of the block 328. A first output of the block 328 is provided to a decode block 330, whose output provides decoded symbols for the first symbol stream (based on the output of the block 328). Similarly, a second output of the block 334 is provided to a decode block 334, whose output provides decoded symbols for the second symbol stream (based on the output of the block 328).

Figure 4:
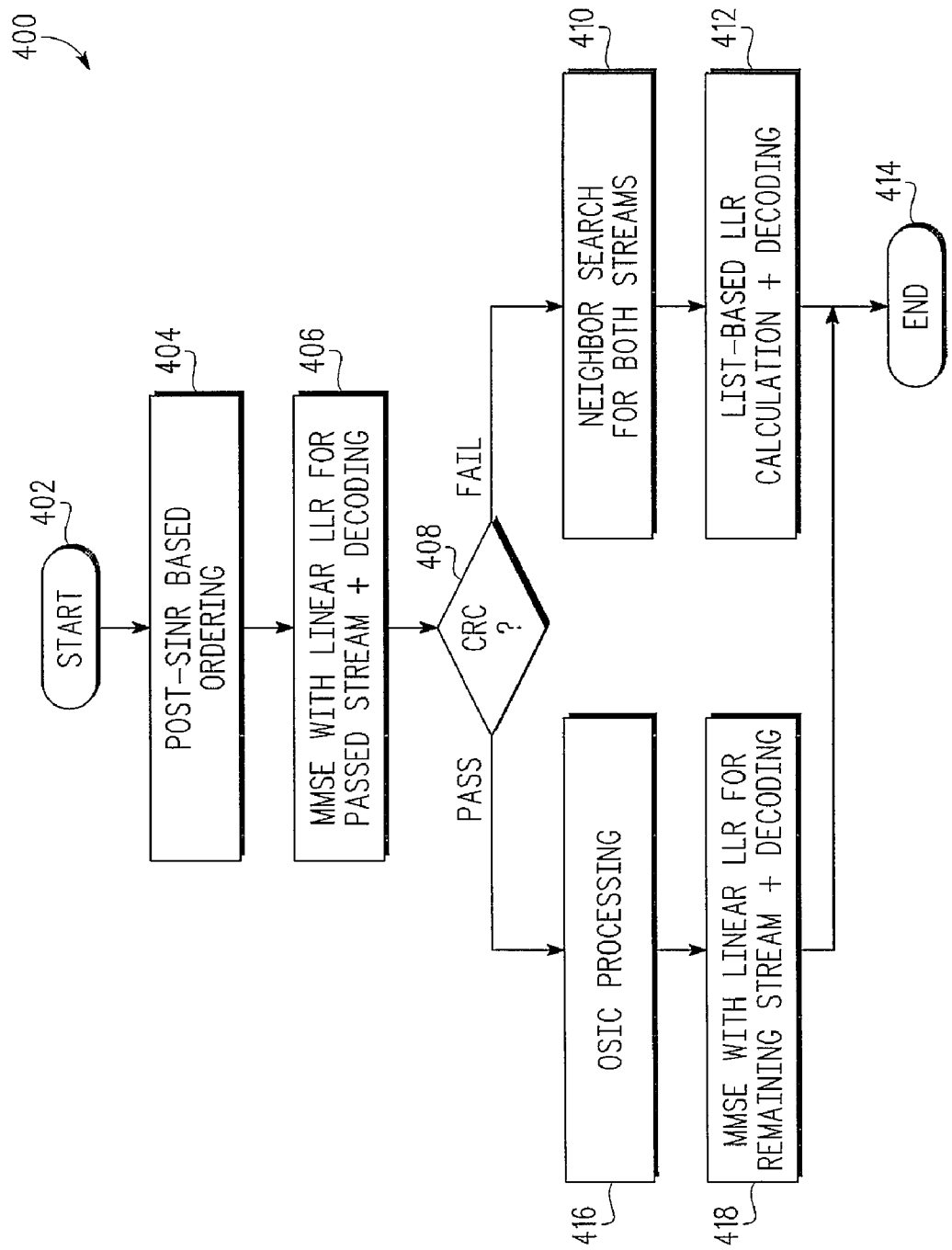
FIG. 4 is a flowchart of a detection process associated with the receiver of FIG. 3.

Turning to FIG. 4, a process 400 for jointly decoding multiple symbol streams is illustrated. The process 400 is initiated at block 402, at which point control transfers to block 404, where ordering of the multiple symbol streams is performed based on a signal metric, e.g., signal-to-noise ratio (SNR), effective SNR, signal-to-interference and noise ratio (SINR), effective SINR, or energy. Next, a first symbol stream is selected (from the multiple signal streams) based on the signal metric and MMSE detection with linear LLR calculation is performed on the first symbol stream, followed by decoding of the first symbol stream. Then, in decision block 406, it is determined whether the decoded first symbol stream passes or fails a CRC. If the decoded first symbol stream passes the CRC in block 406, OSIC processing (based on the first symbol stream) of a second symbol stream is indicated. As such, the decoded first symbol stream is encoded and passed to a negative input of a summer. Next, in block 418, MMSE detection is performed on the second symbol stream to provide an estimated second symbol stream (including multiple hard-decision symbols provided by the MMSE detection). The estimated second symbol stream is passed to a positive input of the summer. An output of the summer provides a successive interference cancelled signal that is passed to an input of a linear LLR, whose output provides a metric for each of the hard-decision symbols in the second symbol stream to an input of a decoder. An output of the decoder provides decoded symbols for the second symbol stream, based on the input from the linear LLR calculation. Following block 418, control transfers to block 414 where the process 400 terminates and returns to a calling process.

If the decoded first symbol stream fails the CRC in block 406, NSA processing of both the first and second symbol streams is indicated. As such, the decoded first symbol stream is encoded and passed to an input of an NSA block for processing. Similarly, MMSE detection is performed on the second symbol stream to provide an estimated second symbol stream (including multiple hard-decision symbols provided by the MMSE detection). The estimated second symbol stream is passed to a linear LLR calculation block to provide metrics for decoding the hard-decision symbols in the second symbol stream. An output of the LLR calculation block is passed to an input of a decode and encode block, which decodes the second symbol stream based on the metrics provided by the linear LLR calculation block. The decoded second symbol stream is then encoded and passed to an NSA block for processing. The NSA blocks provide neighbors for the hard-decision symbols in the first and second symbol streams. Next, in block 412, a list-based LLR calculation block provides metrics for the hard-decision symbols in the first and second symbol streams. A decode block associated with the first symbol stream decodes the first symbol stream using the information provided from the list-based LLR calculation block. Similarly, a decode block associated with the second symbol stream decodes the second symbol stream using the information provided from the list-based LLR calculation block. Following block 412, control transfers to block 414 where the process 400 terminates and returns to a calling process.

Figure 5:
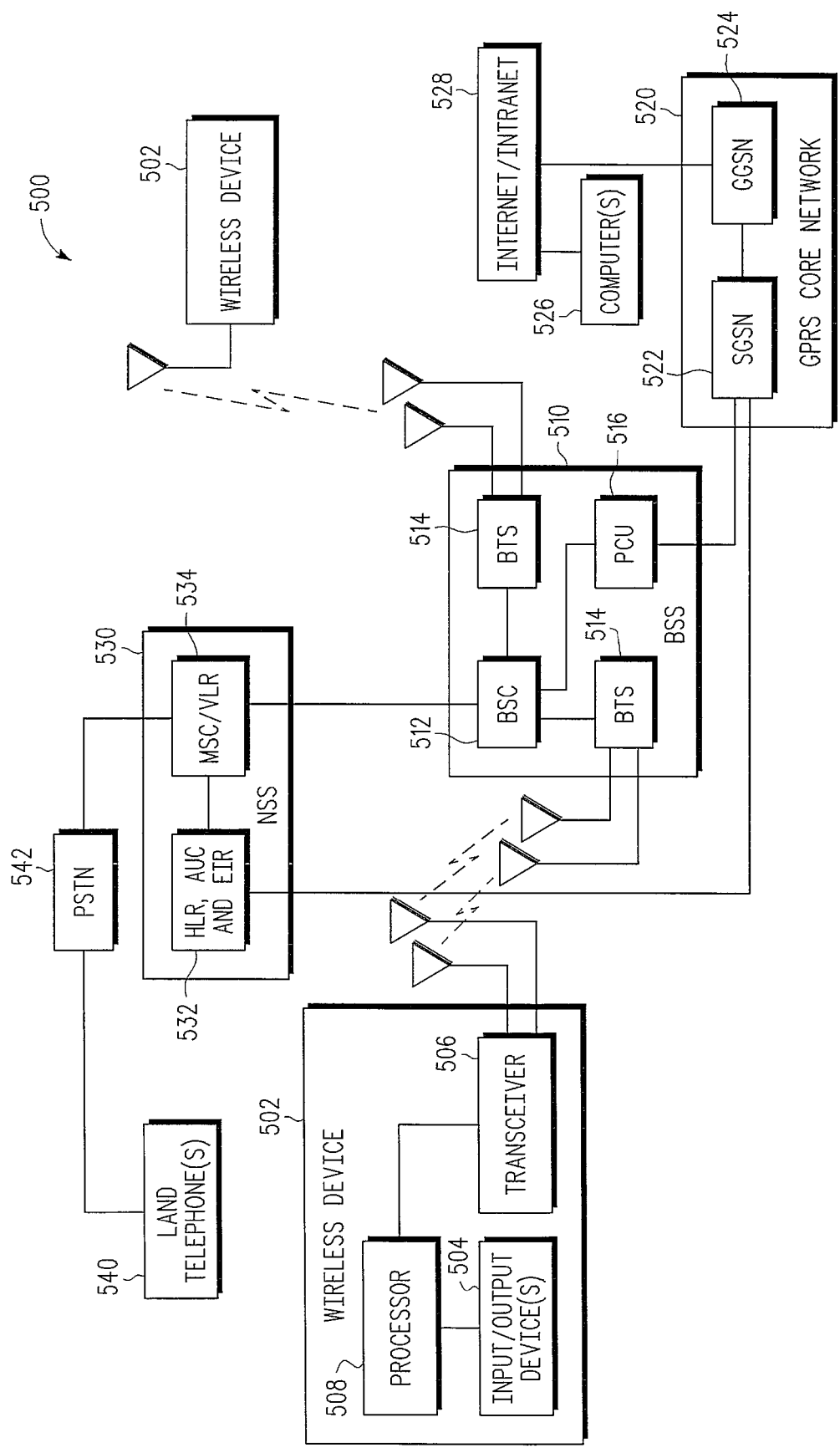
FIG. 5 is a block diagram of an example MIMO wireless communication system that may include receivers that detect channel-coded signals according to various aspects of the present invention.

With reference to FIG. 5, an example wireless communication system 500 is depicted that includes a plurality of wireless devices (subscriber stations) 502, e.g., hand-held computers, personal digital assistants (PDAs), cellular telephones, etc., that may be configured to perform joint detection according to the present disclosure. That is, the wireless devices 502 may include receivers that are configured according to FIGS. 1 and 3. In general, the wireless devices 502 include a processor 508 (e.g., a digital signal processor (DSP)) that employs a software system, a transceiver 506, and one or more input/output devices 504 (e.g., a camera, a keypad, display, etc.), among other components not shown in FIG. 5.

As is noted above, according to various embodiments of the present disclosure, techniques are employed to reduce complexity of joint detection for a communication device, such as the wireless devices 502. The wireless devices 502 communicate with a base station controller (BSC) 512 of a base station subsystem (BSS) 510, via one or more base transceiver stations (BTS) 514, to receive or transmit, control signals, voice, data, or control signals, voice, and data. The BSC 512 may, for example, be configured to schedule communications for the wireless devices 502. Alternatively, the BTS 514 may schedule communications for the wireless devices 502 in which the BTS 514 is in communication. In either case, a scheduler typically employs one or more processors (that execute a software system) to schedule communications.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the wireless devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (EIR) 532. In a typical implementation, the MSC/VLR 534 and the HLR, AUC, and EIR 532 are located within a network and switching subsystem (NSS) 530, which may also perform scheduling for the system 500. The SGSN 522 may communicate directly with the HLR, AUC and EIR 532. As is also shown, the MSCNLR 534 is in communication with a public switched telephone network (PSTN) 542, which facilitates communication between wireless devices 502 and land telephones 540. It should be appreciated that other types of wireless systems, having different configurations, may implement various aspects of the joint detection techniques disclosed herein.

Accordingly, a number of techniques have been disclosed herein that generally reduce complexity associated with detecting channel-coded signals in multiple-input multiple-output communication systems. It is contemplated that the techniques described herein may be advantageously employed in various communication systems (both wired and wireless) that comply with a number of different standards.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of software, firmware or hardware. For example, software that implements the process 400 of FIG. 4 may be executed by a BS and/or an SS. As a preparatory step to practicing the invention in software, code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a hard disk, random access memory (RAM), etc. The method form of the invention may be practiced by combining one or more machine-readable storage devices containing the code according to the present disclosure with appropriate standard processing hardware to execute the code contained therein. An apparatus for practicing the techniques of the present disclosure could be one or more BSs and/or SSs that access code in accordance with the present disclosure.

Although the invention is described herein with reference to specific embodiments, various modifications and changes can be made without departing from the scope of the present invention as set forth in the claims below. For example, the joint detection techniques disclosed herein are generally broadly applicable to receivers, irrespective of location, in a communication system. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of joint detection of channel-coded signals in a multiple-input multiple-output system, comprising:
    determining whether a decoded signal associated with a first symbol stream passes a cyclic redundancy check;
    detecting, when the decoded signal associated with the first symbol stream passes the cyclic redundancy check, channel-coded signals in the first symbol stream and a second symbol stream using minimum mean squared error with ordered successive interference cancellation based detection; and
    detecting, when the decoded signal associated with the first symbol stream fails the cyclic redundancy check, the channel-coded signals in the first and second symbol streams using neighbor search algorithm based detection.

2. The method of claim 1, further comprising:
    selecting the first symbol stream as a reference stream based on a signal metric.

3. The method of claim 2, wherein the signal metric associated with the first symbol stream has a higher value than the signal metric associated with the second symbol stream.

4. The method of claim 2, wherein the signal metric corresponds to a signal-to-noise ratio.

5. The method of claim 2, wherein the signal metric corresponds to an energy level.

6. The method of claim 1, wherein the signal metric corresponds to a signal-to-interference and noise ratio.

7. The method of claim 1, wherein the neighbor search algorithm based detection utilizes a fixed list size.

8. The method of claim 1, wherein the first and second symbol streams are scheduled to a same subscriber station.

9. A method of joint detection of channel-coded signals in a multiple-input multiple-output system, comprising:
    receiving, at a receiver, first and second symbol streams;
    performing hard-decision symbol detection on the first and second symbol streams to provide associated first and second estimated symbol streams; and
    detecting channel-coded signals in the first and second symbol streams using neighbor search algorithm with ordered successive interference cancellation based detection on the first and second estimated symbol streams, wherein interference in the second symbol stream that is attributable to the first symbol stream is substantially removed prior to decoding the second symbol stream.

10. The method of claim 9, further comprising:
    selecting the first symbol stream as a reference symbol stream based on a signal metric.

11. The method of claim 10, wherein the signal metric associated with the first symbol stream has a higher value than the signal metric associated with the second symbol stream.

12. The method of claim 10, wherein the signal metric corresponds to a signal-to-noise ratio or a signal-to-interference and noise ratio.

13. The method of claim 10, wherein the signal metric corresponds to an energy level.

14. The method of claim 9, wherein the neighbor search algorithm utilizes a fixed list size.

15. The method of claim 9, wherein the first and second symbol streams are scheduled to a same subscriber station.

16. A communication device, comprising:
an input device; and
a circuit coupled to the input device, wherein the circuit is configured to:
determine whether a decoded signal associated with a first symbol stream passes a cyclic redundancy check;
detect, when the decoded signal associated with the first symbol stream passes the cyclic redundancy check, channel-coded signals in the first symbol stream and a second symbol stream using minimum mean squared error with ordered successive interference cancellation based detection; and
detect, when the decoded signal associated with the first symbol stream fails the cyclic redundancy check, the channel-coded signals in the first and second symbol streams using neighbor search algorithm based detection.

17. The communication device of claim 16, wherein the circuit is further configured to:
select the first symbol stream as a reference stream based on a signal metric.

18. The communication device of claim 17, wherein the signal metric associated with the first symbol stream has a higher value than the signal metric associated with the second symbol stream.

19. The communication device of claim 18, wherein the signal metric corresponds to a signal-to-noise ratio or a signal-to-interference and noise ratio, an effective signal-to-noise ratio, and effective signal-to-interference and noise ratio, or an energy level.

20. The communication device of claim 16, wherein the neighbor search algorithm based detection utilizes a fixed list size and the first and second symbol streams are scheduled to a same subscriber station.

* * * * *